No. 680,761. Patented Aug. 20, 1901.
C. W. & E. M. BURTON.
PNEUMATIC STRAW STACKER.
(Application filed June 13, 1901.)
(No Model.)
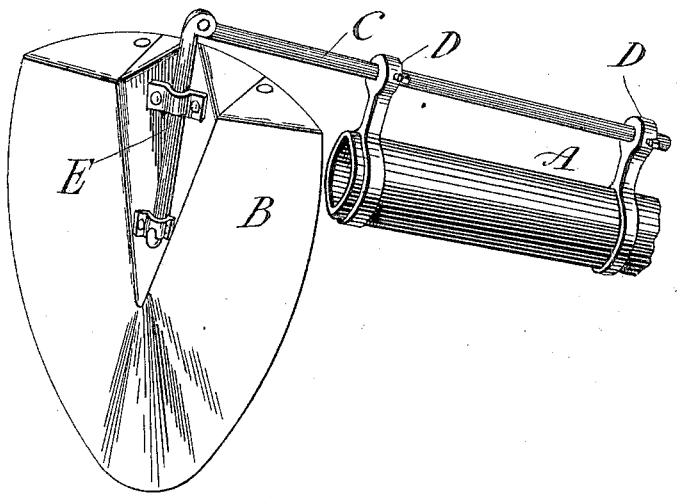
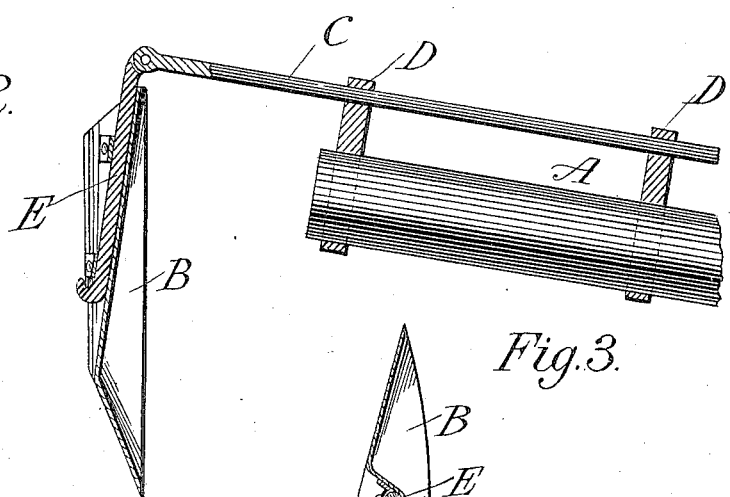
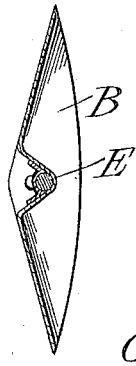
Inventors
Charles W. Burton and
Edward M. Burton

UNITED STATES PATENT OFFICE.

CHARLES W. BURTON AND EDWARD M. BURTON, OF ROYAL CENTER, INDIANA.

PNEUMATIC STRAW-STACKER.

SPECIFICATION forming part of Letters Patent No. 680,761, dated August 20, 1901.

Application filed June 13, 1901. Serial No. 64,414. (No model.)

*To all whom it may concern:*

Be it known that we, CHARLES W. BURTON and EDWARD M. BURTON, citizens of the United States, residing at Royal Center, in the county of Cass and State of Indiana, have invented certain new and useful Improvements in Pneumatic Straw-Stackers; and we do declare the following to be a full, clear, and exact description of the invention, such as will enable others skilled in the art to which it appertains to make and use the same.

The invention relates to pneumatic straw-stackers.

The object of the invention is to provide an improved form of deflector at the discharge end of the pneumatic straw-stacker tube, whereby better control may be had of the straw and the proper stacking of the straw be insured.

With this and other objects in view the invention consists of certain novel features of construction, combination, and arrangement of parts, which will be hereinafter more fully described, and particularly pointed out in the appended claims.

In the accompanying drawings, Figure 1 is a perspective view of the discharge end of a straw-stacker equipped with our improved deflector. Fig. 2 is a vertical sectional view through the deflector and its supporting-rod, and Fig. 3 is a horizontal sectional view.

In the drawings, A denotes the pneumatic straw-stacker tube, and B the deflector. In shape the deflector is concaved—that is, the side adjacent to the discharge-opening of the stacker-tube—and is provided with an angular enlargement directly in advance of the discharge end to divide the air and straw and to deflect it slightly to one side. The enlargement is preferably formed by pressing or stamping the material, and its lower end comes to a point, as shown in Fig. 1. When the straw and air strike this enlargement, the tendency is to spread the straw and air laterally and more evenly divide it, so that as it falls downwardly it will lie in smooth and even strata.

It will be noticed that the lower edge of the deflector is dished or turned inwardly toward the discharge end of the stacker-tube and that the upper edge of the deflector is likewise turned inwardly in the same direction, so as to reduce to a minimum the liability of the straw being forced past the edges of said deflector.

Any suitable means may be provided for connecting the deflector to the stacker-tube, that shown being preferred and consisting of a rod C, which extends parallel with the tube and is connected thereto by collars D, which permit of the rod being moved inwardly or outwardly to adjust the deflector with respect to the discharge end of the tube. The outer end of the rod is provided with a downwardly-projecting hinged extension E, which projects through strap-bearings F, secured to the back of the deflector in the crease formed by the stamping or bulging inwardly of the material to form the angular enlargement. The lower end of the hinged extension is provided with a hook which engages a notch formed in the lowermost strap. The deflector cords or cables may extend from the sides of the deflector for turning it upon its axis to deflect the straw as may be desired, and suitable means may be employed for swinging the deflector inwardly and outwardly—that is to say, swinging it vertically at an angle to the axis of the straw-stacker tube; but as this means forms no part of the present invention it is not deemed necessary to show or describe it in detail.

From the foregoing description, taken in connection with the accompanying drawings, the construction, mode of operation, and advantages of the invention will be readily understood without requiring a more extended explanation.

Various changes in the form, proportion, and details of construction may be made within the scope of the invention without departing from the spirit or sacrificing any of the advantages thereof.

Having thus described our invention, what we claim, and desire to secure by Letters Patent, is—

1. A concaved deflector for pneumatic straw-stackers, provided with an angular enlargement on its concaved face, substantially as set forth.

2. A concaved deflector for pneumatic straw-stackers, provided with an angular enlargement on its concaved face, said enlargement decreasing in width from its top to its bottom, substantially as set forth.

3. The combination with a supporting-rod having a hinged extension, of a deflector pivoted to said hinged extension to rotate about the vertical axis, substantially as set forth.

In testimony whereof we have hereunto set our hands in presence of two subscribing witnesses.

CHARLES W. BURTON.
EDWARD M. BURTON.

Witnesses:
CHRIS. GUGLE,
JAMES F. HARVEY.